(12) United States Patent
Coleman et al.

(10) Patent No.: US 7,883,035 B2
(45) Date of Patent: Feb. 8, 2011

(54) MOBILE DRIP SYSTEM

(75) Inventors: Kyle E. Coleman, Kennewick, WA (US); Monte L. Spence, Moses Lake, WA (US)

(73) Assignee: American Vanguard Corporation, Newport Beach, CA (US)

( * ) Notice: Subject to any disclaimer, the term of this patent is extended or adjusted under 35 U.S.C. 154(b) by 48 days.

(21) Appl. No.: 12/234,157

(22) Filed: Sep. 19, 2008

(65) Prior Publication Data

US 2010/0072304 A1 Mar. 25, 2010

(51) Int. Cl.
  *B05B 3/18* (2006.01)
  *B05B 3/00* (2006.01)
  *B05B 15/00* (2006.01)
(52) U.S. Cl. ...................... 239/728; 239/542
(58) Field of Classification Search ................. 239/542, 239/722, 723, 726, 728, 734, 741, 743, 744
See application file for complete search history.

(56) References Cited

U.S. PATENT DOCUMENTS

| | | | |
|---|---|---|---|
| 1,260,764 A * | 3/1918 | Gildea | 239/728 |
| 2,174,600 A | 10/1939 | Schutmaat | |
| 3,498,314 A | 3/1970 | Gheen | |
| 3,587,763 A * | 6/1971 | Kinkead | 239/733 |
| 3,870,235 A | 3/1975 | Newell | |
| 4,277,026 A | 7/1981 | Garvey | |
| 4,350,295 A | 9/1982 | Gheen | |
| 4,382,555 A * | 5/1983 | Ucinhazska et al. | 239/734 |
| 4,405,085 A * | 9/1983 | Meyer | 239/726 |
| 4,429,831 A | 2/1984 | Maddox | |
| 4,491,274 A * | 1/1985 | Noble | 239/734 |
| 4,676,438 A | 6/1987 | Sesser | |
| 4,763,836 A | 8/1988 | Lyle | |
| 4,771,947 A | 9/1988 | Smeller | |
| 4,970,973 A | 11/1990 | Lyle | |
| 5,267,695 A | 12/1993 | Thayer | |
| 5,421,514 A | 6/1995 | McKenry | |
| 5,586,728 A | 12/1996 | McKenry | |
| 5,678,771 A * | 10/1997 | Chapman | 239/727 |
| 5,779,163 A | 7/1998 | Gunter | |
| 6,343,749 B1 | 2/2002 | Thom | |
| 6,820,828 B1 * | 11/2004 | Greenwalt | 239/726 |
| 2002/0066810 A1 * | 6/2002 | Prandi | 239/728 |
| 2005/0211802 A1 | 9/2005 | Newton | |

* cited by examiner

*Primary Examiner*—Darren W Gorman
(74) *Attorney, Agent, or Firm*—Lawrence N. Ginsberg

(57) ABSTRACT

A mobile drip irrigation system that includes a supply pipe connected at one end to a liquid source and extending therefrom. At least one tower supports the supply pipe above the ground, and includes a driver for moving the tower and supply pipe in a desired direction. A plurality of ports are positioned along the supply pipe. The system includes a plurality of vertically oriented drop line assemblies. Each drop line assembly has an upper end connected to one of the plurality of ports, and a lower end spaced above the ground. A horizontal liquid distribution system is fluidly connected to the plurality of drop line assemblies to allow a horizontally uniformly spaced drip of the liquid at a desired distance from the ground.

12 Claims, 3 Drawing Sheets

MOBILE DRIP SYSTEM

BACKGROUND OF THE INVENTION

1. Field of the Invention

The present invention relates generally to field irrigation systems, and more particularly to an improved irrigation system which combines the water efficiency of surface drip irrigation with the flexibility and economic advantages of center pivot or linear move irrigation systems.

2. Description of the Related Art

Conventional mobile irrigation systems may be classified in two general types: center pivot, and linear move. A center pivot irrigation system includes a central pump station which supplies a source of water, and a plurality of towers extending radially from the central pump station and carrying a supply pipe. The supply pipe has a plurality of uniformly spaced sprinkler heads which spray water along the length of the supply pipe. The towers include driven wheels and move in a circular pattern about the central pump station.

A linear move irrigation system includes a plurality of towers with driven wheels, the towers carrying a water supply pipe having sprinkler heads distributed along the pipe. One end of the supply pipe is then connected to a source of water, and the entire pipe is moved in a direction perpendicular to the axis of the pipe, to irrigate a field.

These mobile irrigation systems are popular because of their flexibility and economics. However, the water efficiency of prior art mobile irrigation systems is quite poor. This low water efficiency is mainly due to water evaporation and wind drift, because the sprinkler heads are located high above the ground (typically 15-20 feet) along the supply pipe carried by the mobile towers.

In partial solution to the problems stated above, U.S. Pat. No. 6,343,749, entitled "Mobile Drip Irrigation System" issued to Thom, discloses and claims a mobile drip irrigation system that includes an existing mobile irrigation system with the sprinkler heads removed and drip lines connected to the locations of the removed sprinkler heads. Each drip line includes a drop line extending from the irrigation system supply pipe, generally vertically to a lower end spaced slightly above the ground. A drip hose is connected to the lower end of each drop line and has a plurality of drip irrigation emitters along the length thereof. A weight is attached to the lower end of each drop line to maintain the drop line in a generally vertical orientation as the irrigation system moves through the field. A drip hose is fluidly connected to the lower end of the drop line and extends rearwardly therefrom with substantially its entire length in contact with the ground, including a plurality of drip irrigation emitters uniformly spaced along substantially the entire length thereof. The device is functional when utilized with relatively small fields such as mint fields; however, because it cannot be used effectively in larger fields because it irrigates only at the drop points, i.e. it does not distribute liquid significantly in lateral directions.

U.S. Pat. No. 4,429,831, entitled "Ground Release Irrigation System" issued to G. H. Maddox, discloses an irrigation system is provided wherein a conventional central pivot spray-type system is converted into a ground release system through the use of a plurality of flexible hoses that release the water at ground level. A plurality of perforations at the distal end of the hose provide a spray effect without the water evaporation loss associated with conventional spray systems. Braces also prevent the hoses from swinging sideways and becoming entangled. The '831 system, like the '749 system use drip irrigation; however, release is at the ground level. The hose being located at the ground provides undesired movement which is partially compensated by restraining devices.

SUMMARY OF THE INVENTION

In a broad aspect, the present invention is a mobile drip irrigation system that includes a supply pipe connected at one end to a liquid source and extending therefrom. At least one tower supports the supply pipe above the ground, and includes drive means for moving the tower and supply pipe in a desired direction. A plurality of ports are positioned along the supply pipe. The system includes a plurality of vertically oriented drop line assemblies. Each drop line assembly has an upper end connected to one of the plurality of ports, and a lower end spaced above the ground. A horizontal liquid distribution system is fluidly connected to the plurality of drop line assemblies to allow a horizontally uniformly spaced drip of the liquid at a desired distance from the ground. The height in which the fluid is dispensed is easily adjusted. Furthermore, the system can be easily dismantled and returned to a spray configuration.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
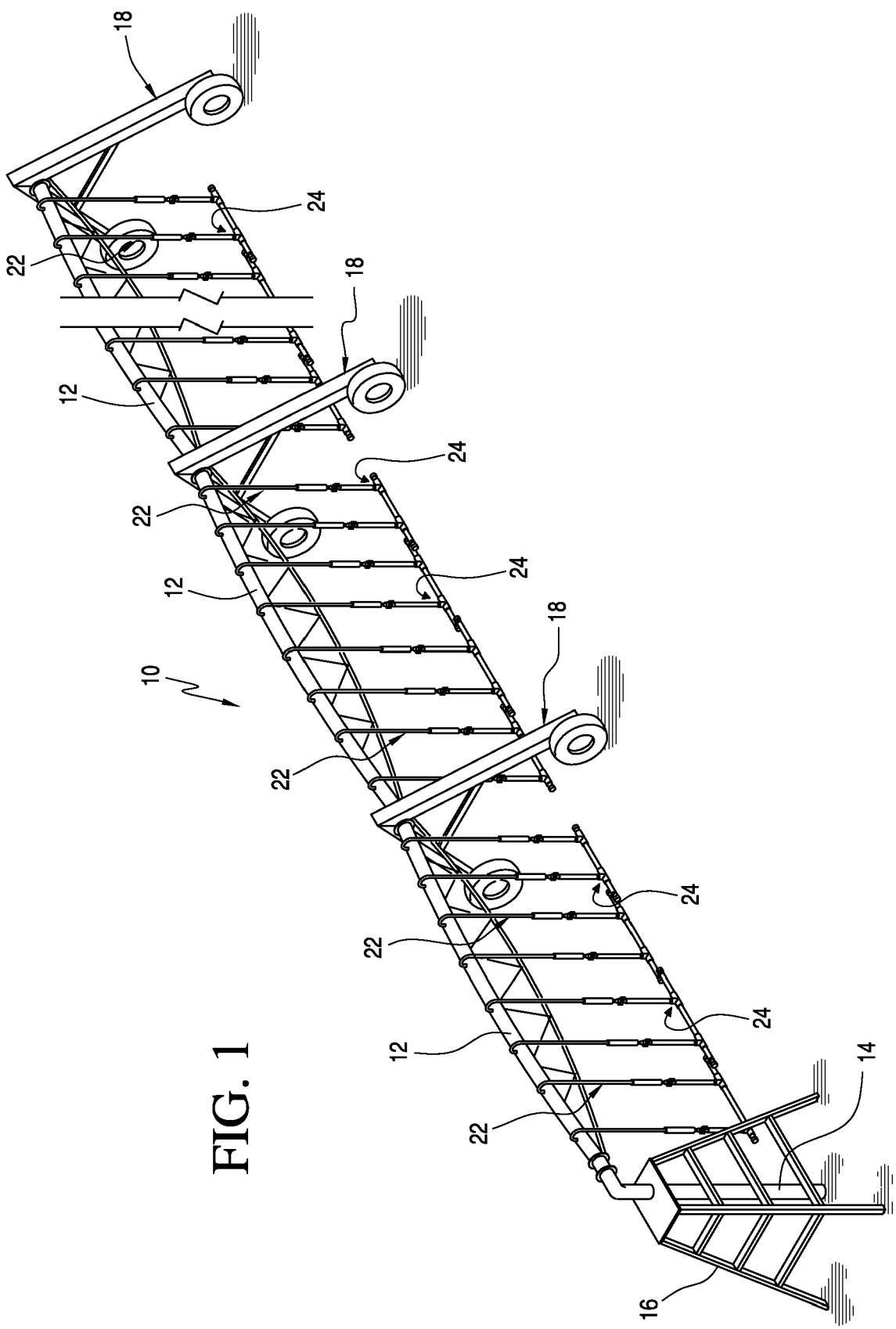
FIG. 1 is a schematic perspective illustration of a center pivot irrigation system utilizing the mobile drip irrigation system of the present invention.

Referring now to the drawings and the characters of reference marked thereon, FIG. 1 illustrates the mobile drip irrigation system of the present invention, designated generally as 10. The mobile drip irrigation system 10 includes a supply pipe 12 connected at one end to a liquid source 14. The liquid source is generally a liquid pump station 14 with support structure 16. In a preferred embodiment the present invention is embodied as a center pivot irrigation system; and, the liquid pump station 14 is a center pivot liquid pump station. However, the present invention can also be utilized in the same fashion to modify prior art linear move irrigation systems. The supply pipe 12 extends outwardly from the liquid source 14 and a plurality of mobile towers 18 spaced substantially uniformly along the supply pipe 12. The supply pipe 12 includes a plurality of ports 20 which would normally have sprinkler heads operably mounted thereon, for spraying water. These conventional sprinkler heads (not shown) have been removed. They have been replaced with a plurality of vertically oriented drop line assemblies 22. Each drop line assembly 22 has an upper end connected to one of the plurality of ports 20 and a lower end spaced above the ground at a desired distance. A horizontal liquid distribution system 24 is fluidly connected to the plurality of drop line assemblies 22 to allow a horizontally uniformly spaced drip of the liquid at a desired distance from the ground.

The horizontal liquid distribution system 24 includes a plurality of horizontally disposed distribution pipes 26 connected to the plurality of drop line assemblies 22. The horizontally disposed distribution pipes 26 have spaced openings for providing the spaced drip.

Figure 2:
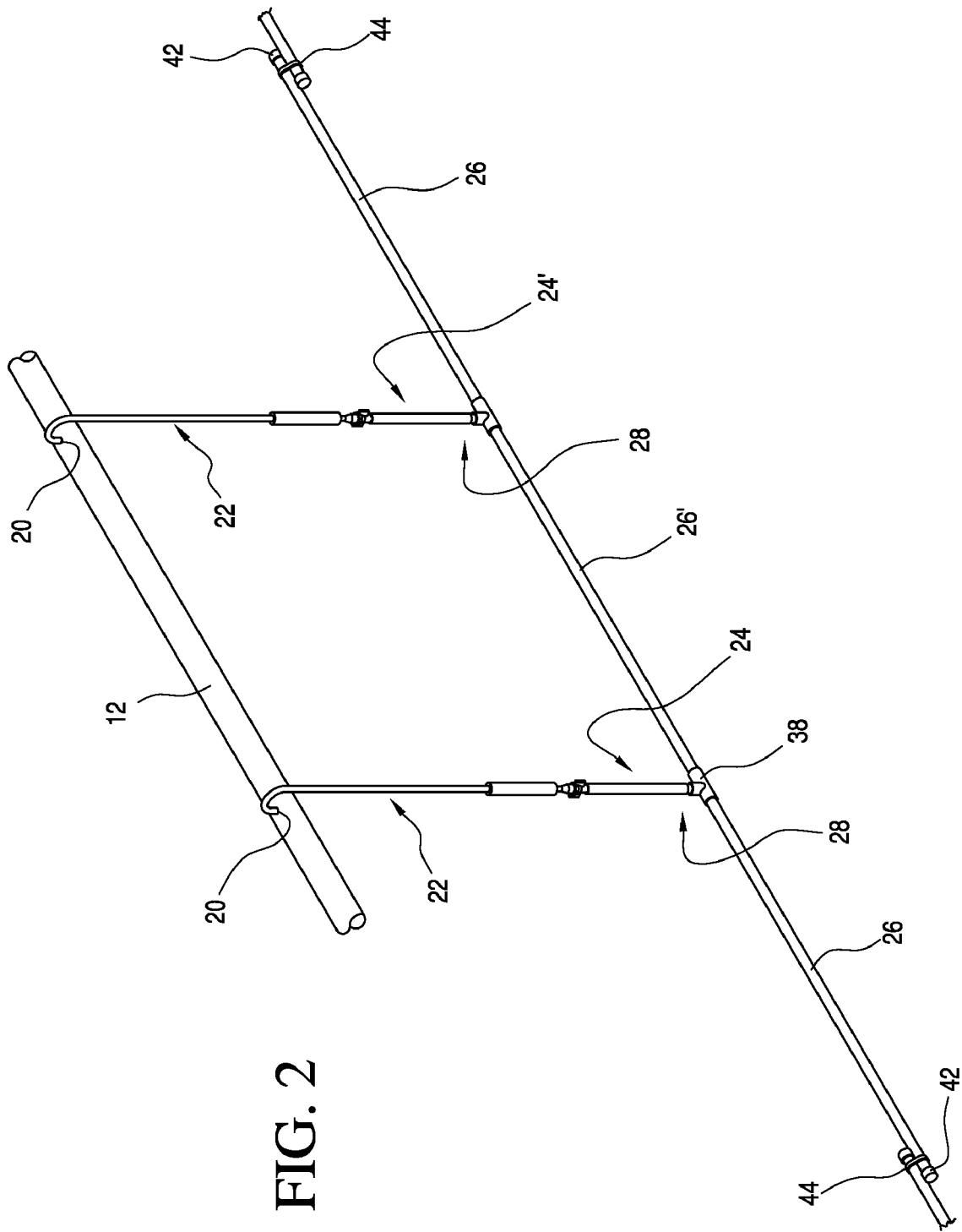
FIG. 2 is an enlarged perspective view of two vertically oriented drop line assemblies and a portion of the horizontal liquid distribution system of the mobile drip irrigation system of the present invention.
Figure 3:
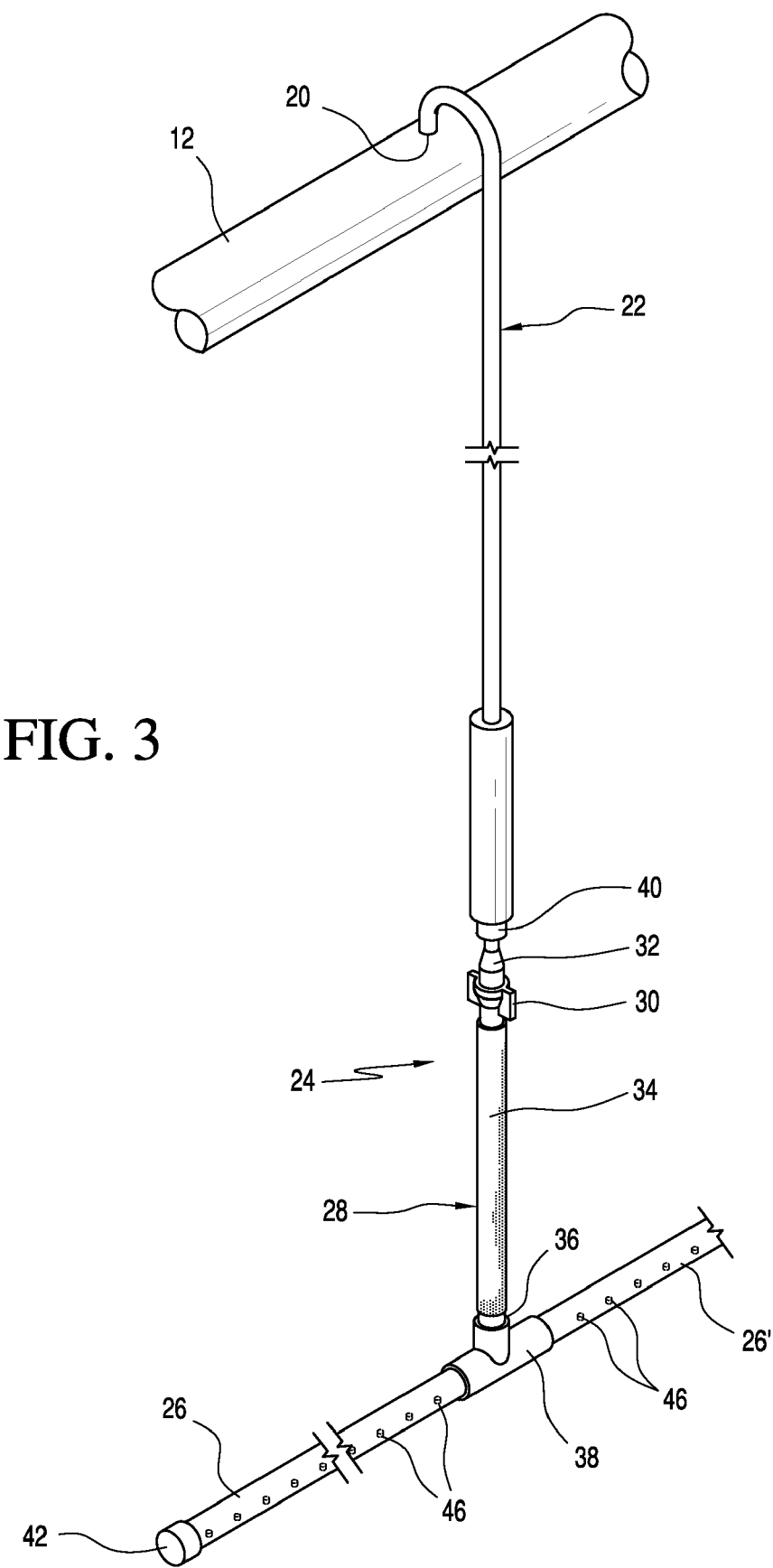
FIG. 3 is an enlarged perspective view of a drop line assembly and a portion of the horizontal liquid distribution system of the mobile drip irrigation system.

Referring now to FIG. 2, an enlarged perspective view of two drop line assemblies 22 and a portion of the horizontal distribution system 24 of the mobile drip irrigation system 10 is shown. In this embodiment the horizontal distribution system 24 includes a plurality of distribution pipe assemblies 28. As can be seen more easily in FIG. 3, each distribution pipe assembly 28 includes an adapter 30 for attachment to a drop line or a nozzle 32 of an associated drop line assembly 22. The adapter may be, for example, a Nelson HD3000 hose drag adapter, manufactured by Nelson Irrigation Corp., Walla Walla, Wash. A substantially vertical hose 34, typically formed of polycarbonate is attached to the adapter 30. A lower connector 36 is attached to the flexible hose 34. A tee 38, having an inlet, is attached to the lower connector 36. A first horizontal distribution pipe 26 is connected to a first outlet of the tee 38 while a second horizontal distribution pipe 26' is connected to a second outlet of the tee 38.

The upper ends of the horizontal distribution system, defined by the adapters 30, connect to their respective drop line assembly 22 via an appropriate connector assembly 40. The connector assembly 40 may be a quick disconnect fitting such as a CAM LOCK® quick disconnect or a barb assembly.

In a preferred embodiment, one of the horizontal distribution pipes 26 has an end cap 42. The other horizontal distribution pipe 26' is connected to an associated outlet (or tee) 38 of an adjacent distribution pipe assembly 24' thereby defining a connecting support element therewith. The horizontal distribution pipes 26 of adjacent distribution pipe assemblies, with end caps 42, mutually support each other by a suitable fastener 44.

In an alternative embodiment ends having end caps 42 may be supported relative to the substantially vertical hose 22 by an elastic support member such as a bungee cord (not shown).

The horizontal distribution pipes 26, 26' are typically formed of aluminum. They each include at least one row of spaced openings 46. The spacing between the spaced openings 46 are not necessary equal or of uniform size. They should be designed to allow the water to be uniformly distributed over the surface without drilling into the soil. Furthermore, they should be designed as such to minimize the forming of droplets which are sufficiently small to generate a mist.

Other embodiments and configurations may be devised without departing from the spirit of the invention and the scope of the appended claims. For example, although the horizontal distribution system has been shown to include two drop line assemblies that are connected to a horizontal distribution pipe it is understood that there may be various alternative ways in which the drop line assemblies and horizontal distribution pipes can be configured. For example, the system may be configured to such that there is a single drop line assembly with both horizontal distribution pipes depending therefrom having end caps.

The invention claimed is:

1. A mobile drip irrigation system, comprising:
   a) a supply pipe connected at one end to a liquid source and extending therefrom;
   b) at least one tower supporting the supply pipe above the ground, and including drive means for moving the tower and supply pipe in a desired direction;
   c) a plurality of ports along the supply pipe;
   d) a plurality of vertically oriented drop line assemblies, each drop line assembly having an upper end connected to one of said plurality of ports, and a lower end spaced above the ground; and,
   e) a horizontal liquid distribution system fluidly connected to said plurality of drop line assemblies to allow a horizontally uniformly spaced drip of said liquid at a desired distance from the ground, said horizontal liquid distribution system including a plurality of horizontally disposed distribution pipes connected to said plurality of drop line assemblies, said horizontally disposed distribution pipes having spaced openings without spray nozzles for providing said spaced drip.

2. The mobile drip irrigation system of claim 1, wherein said plurality of horizontally disposed distribution pipes, is each connected to a respective one of said drop line assemblies at approximately a middle portion thereof.

3. The mobile drip irrigation system of claim 1, wherein said mobile drip irrigation system operates as a center pivot irrigation system.

4. The mobile drip irrigation system of claim 1, wherein said horizontal distribution system, comprises:
   a plurality of distribution pipe assemblies, each distribution pipe assembly, comprising:
   a) an adapter for attachment to a drop line or a nozzle of an associated drop line assembly;
   b) a substantially vertical hose attached to said adapter;
   c) a lower connector attached to said vertical hose;
   d) a tee having an inlet attached to said lower connector;
   e) a first horizontal distribution pipe connected to a first outlet of said tee; and,
   f) a second horizontal distribution pipe connected to a second outlet of said tee, wherein said first and second horizontal distribution pipes each have a plurality of spaced openings for providing said horizontally uniformly spaced drip.

5. The mobile drip irrigation system of claim 4, wherein said adapter is connected to a drop line assembly via a connector assembly comprising a quick disconnect fitting.

6. The mobile drip irrigation system of claim 4, wherein said adapter is connected to a drop line assembly via a connector assembly comprising a barb assembly.

7. The mobile drip irrigation system of claim 4, wherein said first horizontal distribution pipe of each distribution pipe assembly has an end cap thereon; and said second horizontal distribution pipe of each distribution pipe assembly is connected to an associated outlet of an adjacent distribution pipe assembly thereby defining a connecting support element therewith.

8. The mobile drip irrigation system of claim 4, wherein said first horizontal distribution pipe of each distribution pipe assembly has an end cap thereon.

9. The mobile drip irrigation system of claim 4, wherein said first horizontal pipe of each distribution pipe assembly has an end cap thereon, said first horizontal distribution pipe being secured to an adjacent horizontal distribution pipe of an adjacent distribution pipe assembly thereby support each horizontal distribution pipe relative to said substantially vertical flexible hose.

10. The mobile drip irrigation system of claim 4, wherein said first and second horizontal distribution pipes are formed of aluminum.

11. The mobile drip irrigation system of claim 4, wherein said plurality of spaced openings comprises at least one row of said spaced openings.

12. The mobile drip irrigation system of claim 1, wherein said horizontal liquid distribution system is connected to said plurality of drop line assemblies by a plurality of quick disconnect assemblies.

* * * * *